Jan. 23, 1951 R. G. WAMPACH 2,538,994
MOTOR CONTROL ARRANGEMENT
Filed April 6, 1949 2 Sheets-Sheet 1

INVENTOR
ROBERT G. WAMPACH
BY Emery Robinson
ATTORNEY

Jan. 23, 1951   R. G. WAMPACH   2,538,994
MOTOR CONTROL ARRANGEMENT
Filed April 6, 1949   2 Sheets-Sheet 2

INVENTOR
ROBERT G. WAMPACH
BY Emery Robinson
ATTORNEY

Patented Jan. 23, 1951

2,538,994

UNITED STATES PATENT OFFICE 2,538,994

MOTOR CONTROL ARRANGEMENT

Robert G. Wampach, Chicago, Ill., assignor to Teletype Corporation, Chicago, Ill., a corporation of Delaware Application April 6, 1949, Serial No. 85,881

2 Claims. (Cl. 178—4.1)

This invention relates to telegraph communication systems and more particularly to motor control arrangements for use in such systems.

A primary object of the invention is to provide a motor control arrangement which is effective automatically in response to different line conditions.

More specifically, the present invention is concerned with facilities for starting or stopping a motor after predetermined line conditions have been established. For example, if the signal line is normally marking, the motor will be started upon receipt of a break signal, or the establishment of a break condition in the line. Moreover, with the motor control according to the present invention the motor will be stopped pursuant to a steadily marking line for a predetermined time. Furthermore, according to the invention, the motor will be stopped and the local rectifier will be shut off pursuant to a steadily spacing line for a predetermined time. If the motor has been stopped and the rectifier has been shut off, the rectifier will have power applied to it when the line is re-established after a "break"; but the motor will not be started until the receipt of another "break" signal.

Figure 1:
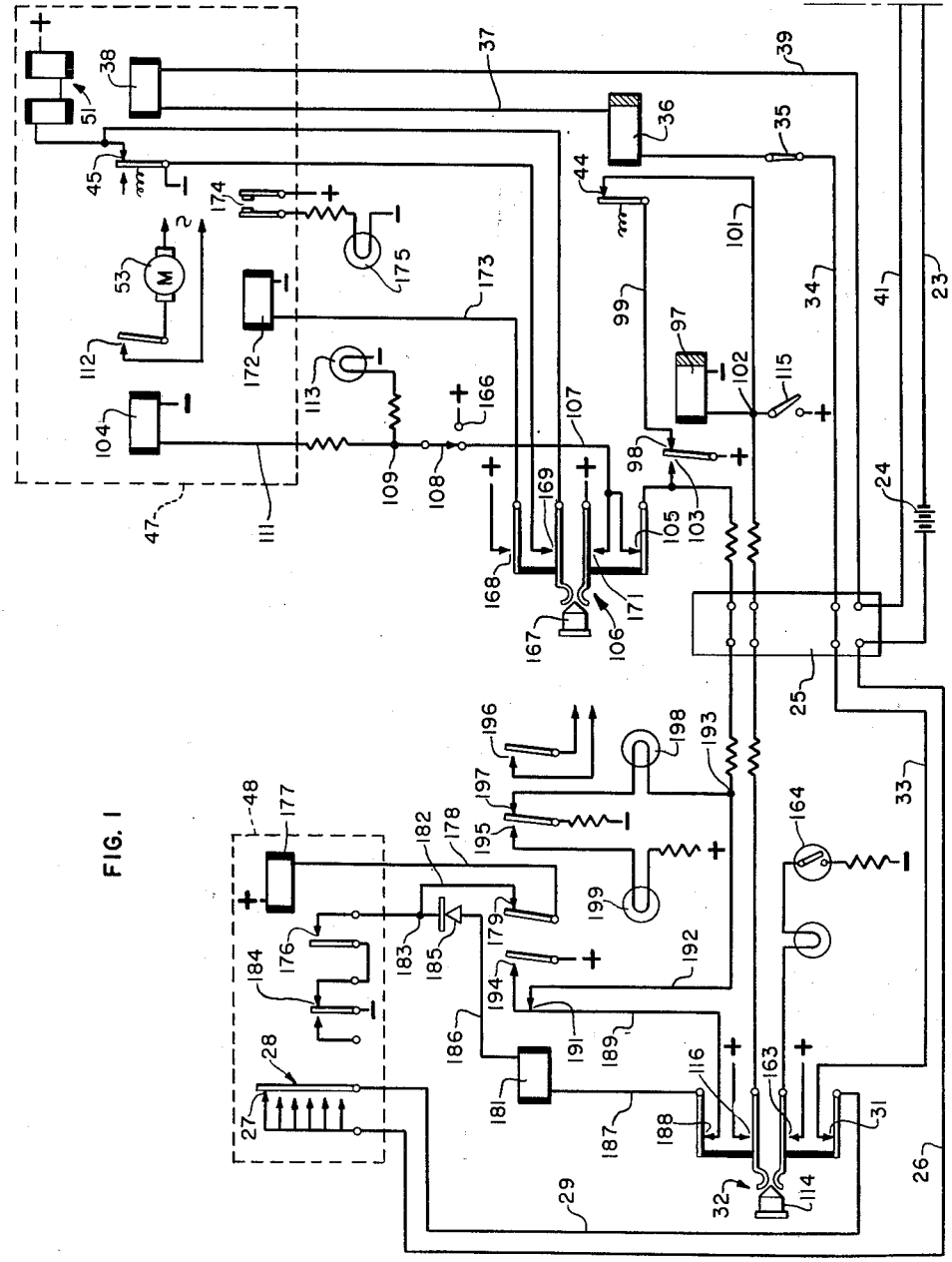
Figures 1, 2, 3:
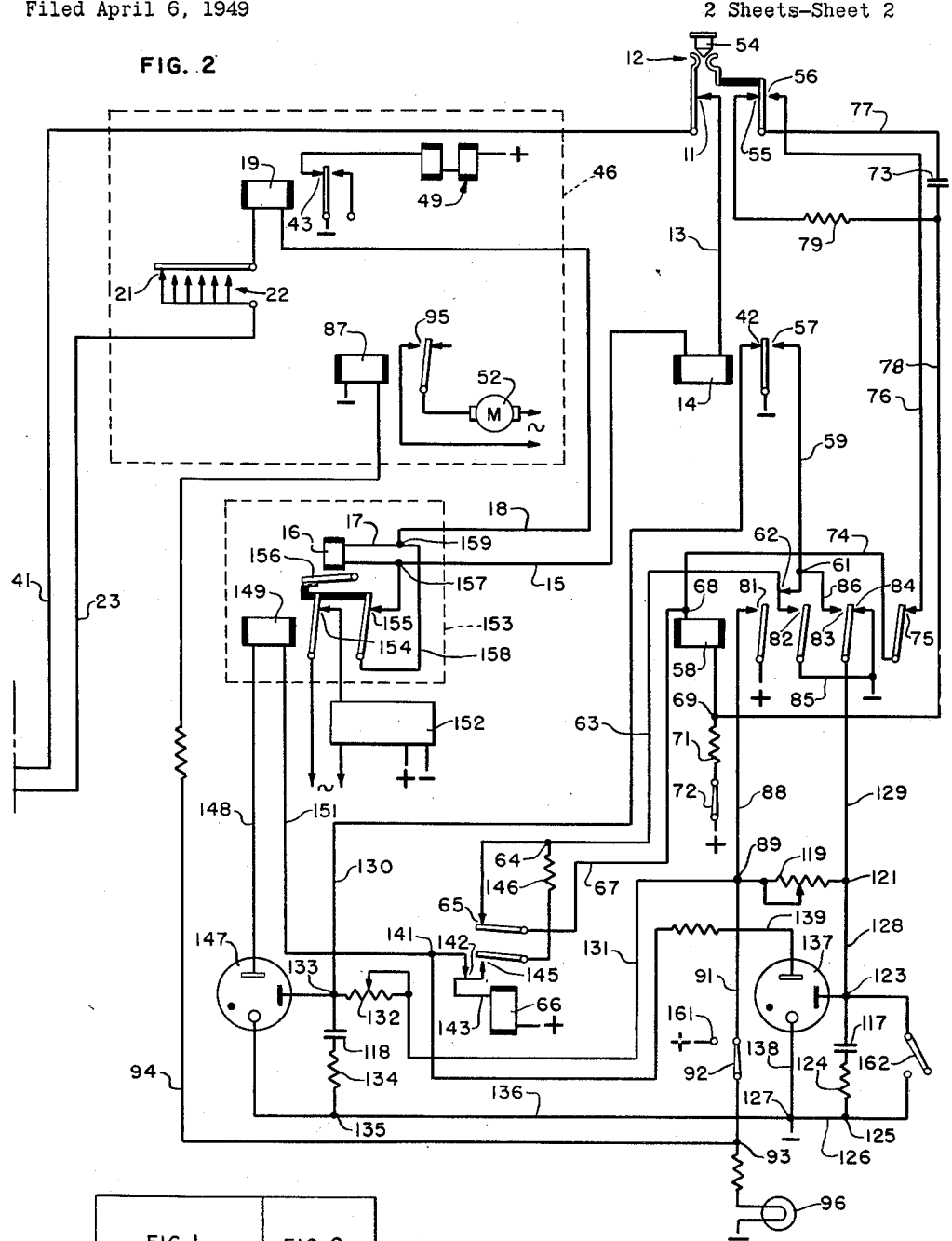

A more complete understanding of the invention may be had from the following description taken in conjunction with the accompanying drawings, wherein, Fig. 1 is an electrical circuit diagram of the switching center associated with the communication system according to the present invention;

Fig. 2 is an electrical circuit diagram of the outlying station connected to the switching center in which station is embodied the motor control arrangement according to the present invention; and Fig. 3 is a view showing the relative arrangement of Figs. 1 and 2.

Having reference to Figs. 1 and 2, the signal line circuit extends from contact 11 (now closed) of motor start switch 12 (Fig. 2), over conductor 13, through the winding of relay 14, over conductor 15 to junction 157, through contact 155, over conductor 158 to junction 159, over conductor 18, through the winding of line relay 19, through the stop contact 21 of the set of transmitting contacts 22, over conductor 23, through the battery 24 (Fig. 1), through patch board 25, over conductor 26, through stop contact 27 of the set of transmitting contacts 28, over conductor 29, through contact 31 (normally closed) of the start key 32, over conductor 33, through patch board 25, over conductor 34, through manually operated switch 35, through the winding of relay 36, over conductor 37, through the winding of line relay 38, over conductor 39, through patch board 25, over conductor 41 to contact 11. In this condition of the circuit, which is a marking condition, the relays 14, 19, 36 and 38 are energized, and contacts 42, 43, 44 and 45 of relays 14, 19, 36 and 38, respectively, are held closed. Relay 16 at this time is short circuited.

The dotted rectangle 46 (Fig. 2) represents a telegraph printer or receiver of the type exemplified by U. S. Patent No. 1,904,164. The dotted rectangle 47 (Fig. 1) represents a typing reperforator machine of the type shown in U. S. Patent No. 2,348,214. The rectangle 48 (Fig. 1) represents a tape transmitter of the type shown in U. S. Patent No. 2,296,845. Contacts 43 of line relay 19 in response to signaling impulses controls the selector magnets 49. Similarly, the contacts 45 of line relay 38 control the selector magnets 51 of the unit 47. Contacts 44 remain closed during code impulsing, since relay 36 is slow acting.

It is assumed that motor 52 of unit 46, and motor 53 of unit 47 are not running. To initiate motors 52 and 53 into operation, the key 54 of motor start switch 12 is depressed, opening contacts 11 and 55 and closing contact 56. The opening of the line circuit at 11 will cause relay 14 to de-energize, thereby opening contact 42 and closing contact 57. Upon the closing of contact 57, a circuit is completed for relay 58 extending from negative battery, through contact 57, over conductor 59 to junction 61, then through contact 62 (now closed) of make-before-break contact, over conductor 63 to junction 64, through contact 65 (now closed) of relay 66, over conductor 67 to junction 68, through the winding of relay 58 to junction 69, then through resistance 71 and switch 72 to positive battery. The energization of relay 58, however, is deferred by the condenser or capacitor 73 which is connected in a parallel circuit extending from junction 68, over conductor 74, through contact 75 (now closed) of relay 58, over conductor 76, through contact 56 (now closed), over conductor 77, through capacitor 73, over conductor 78 to junction 69, then through resistance 71 and switch 72 to positive battery. Because of the shunting effect of capacitor 73, relay 58 cannot operate immediately. Capacitor 73 gradually becomes charged through resistor 71 until the current through the relay 58 is sufficient to operate this relay, starting the motors 52 and 53 as will presently appear. This short time delay, due to the charging of capacitor 73 is necessary and sufficient to insure that the receiving station motor 53 has started before the calling station motor. As soon as the operator has become aware that the motors have started upon the lighting of lamp 96 he will release the key 54 thereby closing contact 55 and opening contact 56. The resistor 79 discharges capacitor 73 when the key 54 is released.

Following this delay caused by the shunting effect of capacitor 73, the relay 58 will become energized and thereby close its contacts 81, 82 and 83, and will open its contacts 62, 84 and 75. A locking circuit for relay 58 is thus completed from negative battery, over conductor 85, through contact 82 (now closed), over conductor 63 to junction 64, then through contact 65, over conductor 67 to junction 68, through winding of relay 58, through resistor 71 and switch 72 to positive battery.

The closing of contact 81 functions to complete an energizing circuit for the motor control relay 87 (Fig. 2), from positive battery, through contact 81 (now closed), over conductor 88 to junction 89, then over conductor 91, through switch 92, to junction 93, then over conductor 94, through the winding of relay 87 to negative battery. Relay 87 upon energization closes its contact 95 to complete an obvious circuit for the motor 52 for operating the unit 46. Moreover, as previously stated upon the closing of contact 81 the lamp 96 will be illuminated to indicate that the motor 52 is operating. Also, when contact 81 is closed, the condensers 117 and 118 will start charging, as will appear hereinafter.

Upon depressing the start switch key 54, the motor 53 at the switching center (Fig. 1) is initiated into operation as follows: The depression of key 54 opens contact 11 which opens the signal line and causes the de-energization of all of the relays connected in the signal line. Relay 36 thus becomes de-energized and causes its contacts 44 to open, thereby breaking the energizing circuit for the slow to release relay 97 which extended from positive battery through contact 98 of relay 97, over conductor 99, through contact 44 (when closed), over conductor 101 to junction 102, then through the winding of relay 97 to negative battery. Thus the de-energization of relay 97 by opening contact 44 causes the contact 98 to open and the contact 103 to close.

The closing of contact 103 establishes a circuit for energizing the motor control relay 104 in unit 47 extending from positive battery, through contact 103 (now closed), through contact 105, (now closed) of tape feed-out switch 106, over conductor 107, through switch 108 to junction 109, then over conductor 111 and through the winding of relay 104 to negative battery. Relay 104, upon energizing, closes its contact 112 to establish an obvious operating circuit for the motor 53 of unit 47. Also, upon the closing of contact 103 the lamp 113 will be illuminated to indicate that the motor 53 is running. The closing of contact 44 in response to marking current on the line, will not cause relay 97 to be operated because its contact 98 has been opened. Relay 97 can only be energized by closing switch 115, or contact 116 associated with key 32.

The delay introduced by capacitor 73 assures sufficient time to release the relays connected in the aforedescribed line circuit. Now, with the units 46 and 47 conditioned for operation, the transmission of messages through the transmitting contacts 22 of the unit 46 under the control of a keyboard device (not shown) will take place, and these messages will be received by the unit 47 under the control of the selector magnets 51.

From the foregoing description it is observed that if the signal line is normally marking, the motors 52 and 53 will start to operate upon receipt of a break signal. This break in the signal line may occur at contact 11 due to the depression of key 54, or it may occur at contact 31 due to the depression of key 114 of start key 32.

According to one feature of the invention, the motor 52 will shut off automatically in response to either a steady marking or a spacing condition (respectively) of the signal line for a predetermined time. During message transmission, the armatures associated with relays 14, 19, and 36 vibrate in response to the signal impulses (relay 26 being slow acting, its armature 44 will not so vibrate). So long as relay 58 remains energized, its contact 81 remains closed and charging circuits for capacitors 117 and 118 are completed. The charging circuit for capacitor 117 extends from positive battery, through contact 81 (now closed), over conductor 88 to junction 89, from thence the circuit for capacitor 117 extends through adjustable resistance 119 to junction 121, then over conductor 128 to junction 123, then through capacitor 117, and resistance 124 to junction 125, over conductor 126 to junction 127, then to negative battery. The capacitor 117 tends to build up a charge, but since contact 57 of relay 14 is continually opening and closing due to signal impulses being impressed on the signal line, the closing of contact 57 during spacing intervals permits the capacitor 117 to discharge over conductors 128 and 129, through contact 83 (now closed), over conductors 86 and 59, through contact 57 (when closed) to negative battery.

Similarly, a charging circuit for capacitor 118 extends from positive battery, through contact 81 (now closed), over conductor 88 to junction 89, then over conductor 131, through adjustable resistance 132 to junction 133, then through capacitor 118 and resistance 134 to junction 135, then over conductor 136 to junction 127, then to negative battery. The capacitor 118 tends to build up a charge, but since contact 42 is continually opening and closing in response to signal impulses, the closing of contact 42 during marking impulses permits the capacitor 118 to discharge over conductor 130 and through contact 42 (when closed) to negative battery.

In response to a steady marking condition on the signal line the contact 42 will remain closed, thereby permitting capacitor 118 to discharge, and allowing the capacitor 117 to build up a charge, since the shorting contact 57 for capacitor 117 is open. When the capacitor 117 has accumulated a sufficient charge it will "fire" the electronic tube 137. Tube 137 is a cold cathode gas triode (for example, of the type OA4-G manufactured by General Electric Company), and when activated or "fired," it will establish a circuit from negative battery, through junction 127, over conductor 138, through tube 137, over conductor 139 to junction 141, then through contact 142, over conductor 143 and through the winding of relay 66 to positive battery. It is advantageous to use a cold cathode tube for the reason that it obviates the necessity for providing circuit facilities for heating a filament in hot cathode electronic tubes. Furthermore the life of a cold cathode tube is longer in the application described, since there is no filament to burn out, therefore, lends itself more readily to continuous standby operation for long periods of time.

Relay 66 will become energized to close its contact 145 and open its contact 65. Contacts 145 and 142 comprise a make-before-break contact arrangement, so that when contact 145 closes, the contact 142 will be opened to break the circuit through tube 137, thus extinguishing or cutting-off said tube 137. The opening of contact 65 of relay 66 will cause relay 58 to become de-energized. However, relay 66 will remain energized over a circuit extending from positive battery, through the winding of relay 66, through contact 145 (now closed), through the resistance 146, conductor 63, through contact 82 (still closed), conductor 85 to negative battery, until relay 58 de-energizes, after which time contact 82 opens and the sustaining circuit (just traced) for relay 66 will be opened and relay 66 will be de-energized.

Upon de-energization of relay 58, its contact 81 opens, and the circuit for motor control relay 87 is broken, thus causing relay 87 to become de-energized to open its contact 95. The circuit for motor 52 is thereby opened at contact 95. The motor 52 may also be stopped manually by opening the manually operable switch 72, which functions to de-energize relay 58 to open contact 81.

According to the aforementioned feature of the invention, the motor 52 will be stopped also in response to a steady or prolonged spacing condition of the signal line. Thus, if the signal line is opened for any reason, and remains open, the relay 14 becomes de-energized and contact 42 thereof remains open. Thus, the shunt circuit for capacitor 118 is removed, and the capacitor 118 is permitted to build up a charge therein. When the capacitor 118 has accumulated a sufficient charge it will "fire" the electronic tube 147. Tube 147 is also a cold cathode gas triode, and when activated or "fired," it will establish a circuit from negative battery to junction 127, over conductor 136 to junction 135, then through the tube 147, over conductor 148, through the winding of relay 149, over conductor 151 to junction 141, then through contact 142, over conductor 143 and through the winding of relay 66 to positive battery. Relays 66 and 149 thereby become energized. The energization of relay 66 functions, as hereinbefore described in connection with sustained marking on the signal line, to stop the motor 52 by de-energizing relay 58 and opening contact 81.

Moreover, the energization of relay 149 functions to open the input circuit of a rectifier 152, and to remove the short circuit from the reset relay 16. The rectifier 152 is used to supply direct current to operate the various relays at the station exemplifier by Fig. 2. Normally, the relay 149 of the mechanical latching relay unit 153 is de-energized, and its contacts 154 and 155 are closed. Contact 154 is in the input circuit of the rectifier 152, thus controlling the supply of alternating current thereto. The contact 155 is included in the short circuit across the reset coil 16.

When the relay 149 is thus energized due to a sustained spacing condition of the signal line (or open line condition), contact 154 will be opened to remove power from the rectifier, and contact 155 will be opened to remove the shunt across relay 16. At substantially the same time, the contacts 154 and 155 will be latched open by the armature 156 of reset relay 16, and will remain open so long as the signal line remains open (i. e., as long as the spacing condition persists). Upon a resumption of marking condition on the line, the relays 14, 16, 19, 36 and 38 will again be energized over the previously described line circuit. Relay 16, upon energizing will pull up its armature 156 to release the contacts 154 and 155 which will thereupon close. The closing of contact 154 will again establish the input circuit for rectifier 152. The closing of contact 155 will restore the shunt circuit for reset relay 16 extending from junction 157 on conductor 15, through contact 155 (now closed) of relay 149, over conductor 158 to junction 159 between conductors 17 and 18. Relay 16 will remain de-energized until the latching relay 149 is again operated in response to a prolonged spacing condition on the line.

In the event that the motor 52 has been stopped in response to a prolonged marking condition on the signal line by the opening of contact 81 of relay 58 and it is desired to operate the motor 52 for test purposes, this may be accomplished by operating switch 92 to battery source 161 which will cause the motor control relay 87 to become energized over the circuit extending from positive battery 161, over switch 92, conductor therefrom to junction 93, over conductor 94, and through the winding of relay 87 to negative battery, thereby closing contact 95 to start the motor 52.

Switch 162 is shown in the "automatic" position; that is, with the switch 162 in the open position, as shown, the tube 137 will be operated in response to a prolonged marking condition to control the stopping of motor 52, as previously described. With the switch 162 in the closed position the motor 52 will not stop in response to a continued marking condition, but only manually by opening switch 72. This condition may be desired during continuous reasonably normal business.

Referring to Fig. 1, motors 53 (and 52, Fig. 2) may also be started under control of the switching station (Fig. 1) by operating or depressing key 114 of start switch 32, the effect of which is to break the signal line momentarily, the same as was the case with the operation of key 12 (Fig. 2). Upon depression of key 114, contact 163 will be closed to complete a circuit for the thermal switch 164. After a predetermined time current will flow through the gas filled thermal switch 164 to light a lamp 165 to indicate to the operator that the motors 52 and 53 are running. In the meantime, the opening of the line at contacts 31 has caused the relay 14 to release causing relay 58 to operate and close its contact 81 to start the motor 52, as previously described. Also, a circuit is completed to relay 97 through contact 116 (now closed) of key 32, holding relay 97 operated when contacts 44 of relay 36 open due to the open line condition, thus preventing motor 53 from starting. This prevents the recording of outgoing messages. The motor 53 can only be stopped manually by closing switch 115 to re-energize relay 97, thereby opening contact 103 in the circuit of the motor control relay 104. The motor 53 can be started manually for test purposes by operating switch 108 to engage battery terminal 166.

The tape-out switch 106 is employed in the event it is desired to space out tape from unit 47. Upon depression of key 167, contacts 168, 169 and 171 will be closed, and contact 105 will be opened. The closing of contact 168 completes a circuit for the tape feed-out magnet 172 extending from positive battery, through contact 168, over conductor 173, and through the winding of magnet 172 to negative battery. The closing of contact 169 serves to place a shunt around the contact 45 to make the selector magnets 51 non-responsive to signal impulses over the line. The closing of contact 171 serves to supply power for operating the motor control relay 104 to keep the motor 53 running. A means for indicating a tape-out condition is also provided in unit 47, and comprises a contact 174 which closes when the tape supply has been depleted, causing a lamp 175 to be lighted.

Assuming now that communication is taking place between unit 46 (Fig. 1) and unit 47 (Fig. 1), and that unit 47 is receiving. It may happen that the operator at the switching station (Fig. 1) will attempt to transmit from unit 48 while said communication is taking place. As described in the aforementioned Patent No. 2,296,845, the insertion of message tape in the unit 48 will result in the closing of contact 176, thus completing a circuit for start magnet 177 from positive battery, through the winding of magnet 177, over conductor 178, through contact 179 of relay 181, over conductor 182 to junction 183, then through contacts 176 and 184 to negative battery. However, a circuit is also completed for the energization of "break" relay 181 extending from negative battery, through contacts 184 and 176 to junction 183, then through a rectifier unit or varistor 185, over conductor 186, through the winding of relay 181, over conductor 187, through contact 188, over conductor 189, through contact 191, over conductor 192 to junction 193, then through patch-board 25, and through contact 163 (still closed) to positive battery. Relay 181, upon energizing, will close its contacts 194, 195, and 196, and open its contacts 179, 191 and 197. The "busy" lamp 198, which was lit, is now extinguished due to the opening of contact 197. The "break" lamp 199 will be lighted, indicating to the operator that he has interrupted communication between units 46 and 47. Contact 196, upon closing, will complete a circuit to a further alarm device, if desired. Contact 179, upon opening, will break the energizing circuit for the start magnet 177 of the tape transmitter unit 48. Contact 194, when closed, completes a locking circuit for relay 181.

Although the present invention has been disclosed in connection with certain specific embodiments thereof, it is understood that such embodiments are merely illustrative and not restrictive, and that all forms coming within the scope and equivalency of the appended claims are intended to be covered by the invention.

What is claimed is:

1. In a telegraph system, a signal line, a telegraph receiver including an operating motor, a motor control relay, a pair of electronic tubes, a first relay means responsive to marking and spacing impulses on said line, a second relay means controlled by said first relay means, said motor control relay means operably related to said second relay means, individual capacitor means for each tube, charging circuits for said capacitor means controlled by said second relay means, said first relay means acting during normal reception of marking and spacing impulses to discharge said capacitor means to render said tubes normally non-conductive, one of said capacitor means effective under the control of said first relay means in response to a prolonged marking condition on said line to accumulate a sufficient charge under the control of said second relay means to render one tube of said pair of tubes conductive, the other of said capacitor means effective under the control of said first relay means in response to a prolonged spacing condition on said line to accumulate a sufficient charge under the control of said second relay means to render the other tube of said pair of tubes conductive, a rectifier for supplying current to all said relay means, a rectifier control means operably related to one of said tubes, and additional relay means for controlling said second relay means, said tubes operably related, through said additional relay means and said second relay means, to said motor control relay means, whereby each of said tubes, when rendered separately conductive, is effective to control said motor control relay to stop said motor, said one of said tubes being further effective to simultaneously operate said rectifier control means to render said rectifier non-operative.

2. In a telegraph system, a signal line, a telegraph receiver including an operating motor, a motor control relay means, an electronic tube, a first relay means responsive to marking and spacing impulses on said line, a second relay means controlled by said first relay means, said motor control relay means operably related to said second relay means, a capacitor means associated with said tube, a charging circuit for said capacitor means controlled by said second relay means, said first relay means acting during normal reception of alternate signal impulse conditions to discharge said capacitor means to render said tube normally non-conductive, said capacitor means effective under the control of said first relay means in response to a prolonged signal condition on said line to accumulate a sufficient charge under the control of said second relay means to render said tube conductive, a rectifier for supplying current to all said relay means, a rectifier control means operably related to said tube, and additional relay means for controlling said second relay means, said tube operably related, through said additional relay means and said second relay means, to said motor control relay means, whereby said tube, when rendered conductive, is effective to control said motor control relay means to stop said motor and to simultaneously operate said rectifier control means to render said rectifier non-operative.

ROBERT G. WAMPACH.

REFERENCES CITED

The following references are of record in the file of this patent:

UNITED STATES PATENTS

| Number | Name | Date |
|---|---|---|
| 2,049,615 | Levy et al. | Aug. 4, 1936 |
| 2,094,733 | Byrnes | Oct. 5, 1937 |
| 2,268,222 | Peterson | Dec. 30, 1941 |
| 2,442,427 | Mullerheim | June 1, 1948 |